US011195495B1

(12) United States Patent
Franklin et al.

(10) Patent No.: US 11,195,495 B1
(45) Date of Patent: Dec. 7, 2021

(54) DISPLAY SYSTEM WITH FACIAL ILLUMINATION

(71) Applicant: Apple Inc., Cupertino, CA (US)

(72) Inventors: Jeremy C. Franklin, San Francisco, CA (US); Andreas G. Weber, Los Altos, CA (US); Brandon E. Clarke, Sunnyvale, CA (US); Forrest C. Wang, Petaluma, CA (US); Wey-Jiun Lin, Los Altos Hills, CA (US); William W. Sprague, Berkeley, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/994,326

(22) Filed: Aug. 14, 2020

Related U.S. Application Data

(60) Provisional application No. 62/899,055, filed on Sep. 11, 2019.

(51) Int. Cl.
*G09G 5/10* (2006.01)
*G09G 5/14* (2006.01)
*F21V 8/00* (2006.01)

(52) U.S. Cl.
CPC ............ *G09G 5/10* (2013.01); *G02B 6/0005* (2013.01); *G09G 5/14* (2013.01); *G09G 2320/02* (2013.01); *G09G 2354/00* (2013.01)

(58) Field of Classification Search
CPC ........ G09G 5/10; G09G 5/15; G09G 2354/00; G09G 2320/02; G02B 6/0005
See application file for complete search history.

(56) References Cited

U.S. PATENT DOCUMENTS

| | | | |
|---|---|---|---|
| 6,771,423 B2 | 8/2004 | Geist | |
| 8,184,067 B1* | 5/2012 | Braun | G06F 1/3231 345/7 |
| 9,134,534 B2 | 9/2015 | Border et al. | |
| 9,223,134 B2 | 12/2015 | Miller et al. | |
| 2007/0236800 A1 | 10/2007 | Cakmakci et al. | |
| 2009/0201466 A1 | 8/2009 | Knecht et al. | |
| 2013/0038510 A1* | 2/2013 | Brin | G02B 27/017 345/8 |
| 2017/0168303 A1* | 6/2017 | Petrov | G02B 27/0176 |
| 2018/0003981 A1* | 1/2018 | Urey | A61B 3/032 |
| 2018/0004289 A1* | 1/2018 | Wilson | G06F 3/013 |

* cited by examiner

*Primary Examiner* — Brent D Castiaux
(74) *Attorney, Agent, or Firm* — Treyz Law Group, P.C.; G. Victor Treyz; Kendall P. Woodruff (57) ABSTRACT

An electronic device such as a head mounted device may have a display that displays an image for a user. Head-mounted support structures may be used to support the display and to support lenses. The image on the display is visible through the lenses from eye boxes. The presence of the user's nose and the presence of opaque lens holder structures presents a risk that some of the image will be obscured by undesired black regions. To reduce or eliminate these black regions, facial illumination may be generated using a light source in the electronic device. The facial illumination may be provided by a light source such as a light-emitting diode die or laser or may be provided by a corner region of the display that contains pixels that do not supply any part of the image.

22 Claims, 6 Drawing Sheets

DISPLAY SYSTEM WITH FACIAL ILLUMINATION

This application claims the benefit of provisional patent application No. 62/899,055, filed Sep. 11, 2019, which is hereby incorporated by reference herein in its entirety.

BACKGROUND

This relates generally to electronic devices and, more particularly, to electronic devices with optical components.

Electronic devices sometimes include optical components. For example, a wearable electronic device such as a head-mounted device may include a display for displaying an image.

Lenses may be used to allow a user of a head-mounted device to focus on a display and view the image. Lens support structures sometimes have a tendency to restrict a user's field of view. The housing of a head-mounted device may also block ambient light, so that the user's nose is not illuminated by the ambient light. These effects present a risk that the user's view of the image will be disrupted by undesired dark regions such as a vertically extending black bars in alignment with the user's nose.

SUMMARY

An electronic device such as a head mounted device may have a display that displays an image for a user. Head-mounted support structures may be used to support the display and to support lenses. When the eyes of a user are placed in eye boxes associated with the head-mounted device, the image on the display is visible through the lenses.

The presence of the user's nose and the presence of opaque lens holder structures adjacent to the user's nose presents a risk that some of the image will be obscured by undesired black regions. For example, vertical black bars may impinge on upper and lower central portions of the image in alignment with the user's nose.

To reduce or eliminate these black regions, facial illumination may be generated using a light source in the head-mounted device. The facial illumination may be provided by a light source such as a light-emitting diode die or laser or may be provided pixels in a corner region of the display that are not involved in supplying any part of the image. The facial illumination may illuminate the nose of the user or other facial surface (e.g., without passing through the lenses).

If desired, light guide structures may be used to supply illumination to a nose surface or other facial surface. For example, a light source may supply illumination to a light guide that is formed as part of a lens holder or other head-mounted support structure. In some configurations, light passes partly through one of the lenses before leaking out lens edge surfaces. This leaking light may be guided toward a facial surface by a light guide to serve as facial illumination.

The head-mounted device may have input-output devices. The input-output devices may include, for example, light sensors. A light sensor may measure a facial surface and this information and/or information on image content can be used in controlling nose illumination or other facial illumination.

DETAILED DESCRIPTION

Electronic devices may include displays and other components for presenting content to users. The electronic devices may be wearable electronic devices. A wearable electronic device such as a head-mounted device may have head-mounted support structures that allow the head-mounted device to be worn on a user's head.

A head-mounted device may contain optical components such as a display for displaying visual content and lenses for allowing the user to view the visual content on the display. The head-mounted support structures may support the display and lenses.

Figure 1:
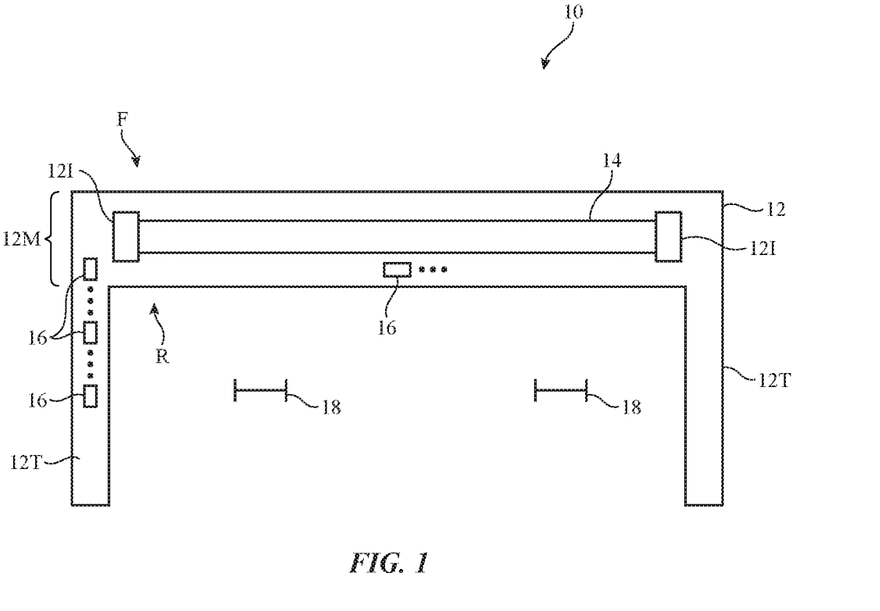
FIG. 1 is a top view of an illustrative electronic device such as a head-mounted device in accordance with an embodiment.

A top view of an illustrative head-mounted device is shown in FIG. 1. As shown in FIG. 1, head-mounted devices such as electronic device 10 may have head-mounted support structures such as housing 12. Housing 12 may include portion 12T to allow device 10 to be worn on a user's head. Main housing portion 12M may include optical components 14 (e.g., a display, lenses, etc.). Housing structures such as internal support structures 12I may support lenses and other optical components 14 (e.g., structures 12I may serve as lens support structures).

Front face F of housing 12 may face outwardly away from a user's head. Rear face R of housing 12 may face the user. During operation, a user's eyes are placed in eye boxes 18. When the user's eyes are located in eye boxes 18, the user may view content being displayed by optical components 14. In some configurations, optical components 14 are configured to display computer-generated content that is overlaid over real-world images (e.g., a user may view the real world through components 14). In other configurations, which are sometimes described herein as an example, real-world light is blocked (e.g., by an opaque housing wall on front face F of housing 12 and/or other portions of device 10).

The support structures of device 10 may include adjustable components. For example, portion 12T of housing 12 may include adjustable straps or other structures that may be adjusted to accommodate different head sizes. Support structures 12I may include motor-driven adjustable lens mounts, manually adjustable lens mounts, and other adjustable optical component support structures. Structures 12I may be adjusted by a user to adjust the locations of eye boxes 18 to accommodate different user interpupillary distances. For example, in a first configuration, structures 12I may place lenses and other optical components associated respectively with the user's left and right eyes in close proximity to each other so that eye boxes 18 are separated from each other by a first distance and, in a second configuration, structures 12I may be adjusted to place the lenses and other optical components associated with eye boxes 18 in a position in which eye boxes are separated from each other by a second distance that is larger than this distance. Nose illuminating light source(s) may be supported by the support structures and may optionally move as other optical components (e.g., lenses, etc.) are moved during support structure adjustments. If desired, user adjustments may be made to adjustable support structures in device 10 to accommodate different nose sizes and other user-to-user variations in body part shapes and/or sizes, thereby allowing each user to enhance wearing comfort and image viewing.

In addition to optical components 14, device 10 may contain other electrical components 16. Components 14 and/or 16 may include integrated circuits, discrete components, printed circuits, and other electrical circuitry. For example, these components may include control circuitry and input-output devices.

The control circuitry of device 10 may include storage and processing circuitry for controlling the operation of device 10. The control circuitry may include storage such as hard disk drive storage, nonvolatile memory (e.g., electrically-programmable-read-only memory configured to form a solid-state drive), volatile memory (e.g., static or dynamic random-access-memory), etc. Processing circuitry in the control circuitry may be based on one or more microprocessors, microcontrollers, digital signal processors, baseband processors, power management units, audio chips, graphics processing units, application specific integrated circuits, and other integrated circuits. Software code may be stored on storage in the control circuitry and run on processing circuitry in the control circuitry to implement control operations for device 10 (e.g., data gathering operations, operations involving the adjustment of the components of device 10 using control signals, etc.). Control circuitry in device 10 may include wired and wireless communications circuitry. For example, the control circuitry may include radio-frequency transceiver circuitry such as cellular telephone transceiver circuitry, wireless local area network (WiFi®) transceiver circuitry, millimeter wave transceiver circuitry, and/or other wireless communications circuitry.

Device 10 may be used in a system of multiple electronic devices. During operation, the communications circuitry of device 10 may be used to support communication between device 10 and other electronic devices in the system. For example, one electronic device may transmit video and/or audio data to device 10 or another electronic device in the system. Electronic devices in the system may use wired and/or wireless communications circuitry to communicate through one or more communications networks (e.g., the internet, local area networks, etc.). The communications circuitry may be used to allow data to be received by device 10 from external equipment (e.g., a tethered computer, a portable device such as a handheld device or laptop computer, online computing equipment such as a remote server or other remote computing equipment, or other electrical equipment) and/or to provide data to external equipment.

The input-output devices of device 10 (e.g., input-output devices in components 16) may be used to allow a user to provide device 10 with user input. Input-output devices may also be used to gather information on the environment in which device 10 is operating. Output components in the input-output devices may allow device 10 to provide a user with output and may be used to communicate with external electrical equipment.

The input-output devices of device 10 may include one or more displays. In some configurations, a display in device 10 may include left and right display devices (e.g., left and right components such as left and right scanning mirror display devices, liquid-crystal-on-silicon display devices, digital mirror devices, or other reflective display devices, left and right display panels based on light-emitting diode pixel arrays (e.g., organic light-emitting display panels or display devices based on pixel arrays formed from crystalline semiconductor light-emitting diode dies), liquid crystal display devices panels, and/or other left and right display devices in alignment with the user's left and right eyes, respectively. In other configurations, the display includes a single display panel that extends across both eyes or uses other arrangements in which content is provided with a single pixel array.

The display of device 10 is used to display visual content for a user of device 10. The content that is presented on the display may include virtual objects and other content that is provided to the display by control circuitry 12 and may sometimes be referred to as computer-generated content. An image on the display such as an image with computer-generated content may be displayed in the absence of real-world content or may be combined with real-world content. In some configurations, a real-world image may be captured by a camera (e.g., a forward-facing camera) so that computer-generated content may be electronically overlaid on portions of the real-world image (e.g., when device 10 is a pair of virtual reality goggles with an opaque display).

The input-output circuitry of device 10 may include sensors. The sensors may include, for example, three-dimensional sensors (e.g., three-dimensional image sensors such as structured light sensors that emit beams of light and that use two-dimensional digital image sensors to gather image data for three-dimensional images from light spots that are produced when a target is illuminated by the beams of light, binocular three-dimensional image sensors that gather three-dimensional images using two or more cameras in a binocular imaging arrangement, three-dimensional lidar (light detection and ranging) sensors, three-dimensional radio-frequency sensors, or other sensors that gather three-dimensional image data), cameras (e.g., infrared and/or visible digital image sensors), gaze tracking sensors (e.g., a gaze tracking system based on an image sensor and, if desired, a light source that emits one or more beams of light that are tracked using the image sensor after reflecting from a user's eyes), touch sensors, buttons, capacitive proximity sensors, light-based (optical) proximity sensors, other proximity sensors, force sensors, sensors such as contact sensors based on switches, gas sensors, pressure sensors, moisture sensors, magnetic sensors, audio sensors (microphones), ambient light sensors, light sensors that make user measurements, microphones for gathering voice commands and other audio input, sensors that are configured to gather information on motion, position, and/or orientation (e.g., accelerometers, gyroscopes, compasses, and/or inertial measurement units that include all of these sensors or a subset of one or two of these sensors), and/or other sensors.

User input and other information may be gathered using sensors and other input devices in the input-output devices of device 10. If desired, device 10 may include haptic output devices (e.g., vibrating components), light-emitting diodes and other light sources, speakers such as ear speakers for producing audio output, and other electrical components used for input and output. If desired, device 10 may include circuits for receiving wireless power, circuits for transmitting power wirelessly to other devices, batteries and other energy storage devices (e.g., capacitors), joysticks, buttons, and/or other components.

Some or all of housing 12 may serve as support structures (see, e.g., housing portion 12T). In configurations in which electronic device 10 is a head-mounted device (e.g., a pair of glasses, goggles, a helmet, a hat, etc.), portion 12T and/or other portions of housing 12 may serve as head-mounted support structures (e.g., structures forming a helmet housing, head straps, temples in a pair of eyeglasses, goggle housing structures, and/or other head-mounted structures). The head-mounted support structures may be configured to be worn on a head of a user during operation of device 10 and may support display(s), lenses, sensors, other input-output devices, control circuitry, and/or other components.

Figure 2:
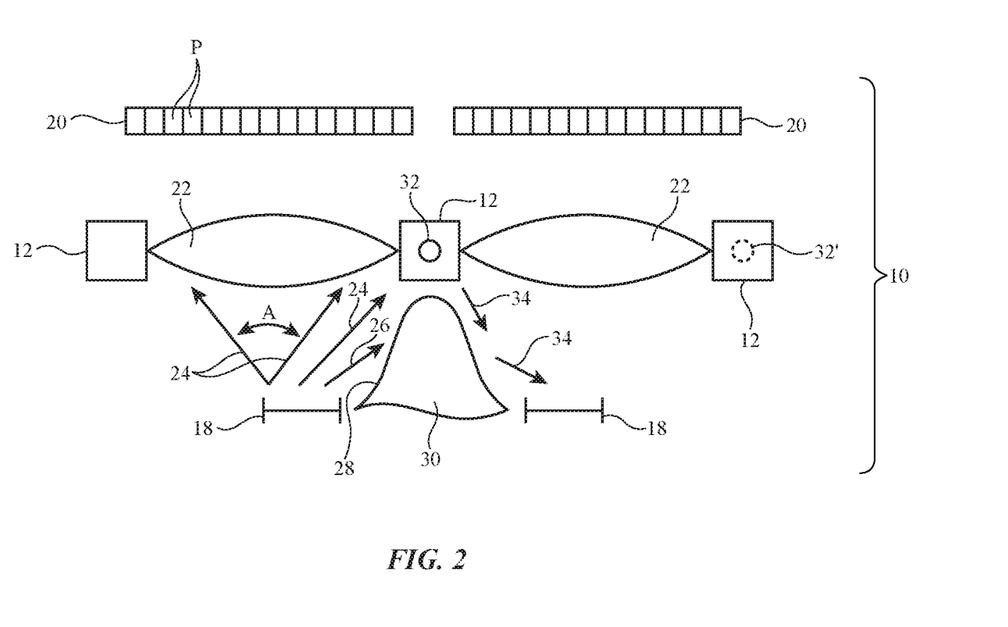
FIG. 2 is a top view of an illustrative head-mounted device with lenses for viewing a display in accordance with an embodiment.

FIG. 2 is a top view of electronic device 10 in an illustrative configuration in which electronic device 10 is a head-mounted device. As shown in FIG. 2, electronic device 10 may include support structures (e.g., housing 12) to support optical components such as lenses 22. The support structures may also support display 20. During operation, display 20 may use pixels P to display images for a user.

Display 20 may include left and right display portions (e.g., sometimes referred to as left and right displays, left and right display devices, left and right display components, or left and right pixel arrays). A user with eyes located in eye boxes 18 may view images on display 20 using lenses 22.

The user's field of view may be restricted by the finite size of lenses 22. In the example of FIG. 2, a user may view visual content through lenses over angle A. Wider angles of view may be blocked by the presence of lens support structures (housing 12). For example, viewing in direction of view 24 of FIG. 2 may be blocked due to the presence of a portion of the head-mounted support structure (housing 12) between left lens 22 and right lens 22. The user's field of view is also somewhat constrained by the presence of the user's nose 30 and/or other portions of the user's face. For example, viewing in direction 26 of FIG. 2 will be blocked due to the presence of surface 28 of nose 30.

Due to the presence of lens holder structures (sometimes referred to as lens support structures) such as the housing structures interposed between lenses 22 of FIG. 2 and due to the presence of facial features such as nose 30, there is a risk that the user who is viewing display 20 from eye boxes 18 will view undesirable black regions that intrude on the image on display 20. For example, nose 30 and the portions of the lens support structures in alignment with nose 30 may tend to create undesirable black bars in the user's view. These black bars may protrude vertically into the image being viewed from the upper and lower edge of the image. Black regions such as black bars may be made more noticeable in scenarios in which nose 28 is enclosed in housing 12 and shaded from ambient light, because this renders nose surface 28 dark.

To counteract undesired black bars that might arise during image viewing, device 10 may have one or more light sources that supply nose illumination or other facial illumination. As an example, a light source such as light source 32 may be mounted in the housing structures formed from housing 12 between lenses 22 as shown in FIG. 1 (e.g., on lens support structures or other head-mounted support structure). This light source may produce light that reduces the visibility of the black bar. In an illustrative configuration, light source 32 generates light 34 that illuminates surface 28 of nose 30 (or other facial surface) and reflects (scatters) from nose surface 28 toward eye boxes 18, as shown in FIG. 1. When nose 30 (e.g., nose surface 28) is illuminated in this way, nose 30 is not dark and does not contribute to undesired black bar effects in device 10. With suitably strong illumination, the illumination of nose surface 28 may counteract black bar effects due to the presence of opaque lens holder structures or other support structures (e.g., illumination of surface 28 will provide a user with a visual impression that the user's field of view is enlarged, because black bars due to the presence of lens holder structure are reduced or eliminated). Because illumination 34 illuminates nose surface 28 (in this example), this facial illumination may sometimes be referred to as nose illumination. The nose illumination is viewable from eye boxes 18 after having been reflected from the surface of the user's nose. In some configurations, light source 32 may produce illumination for a user's cheeks or other facial surfaces in addition to or instead of illuminating a facial surface such as the sides of a user's nose (e.g., light source 32 may provide non-nose facial illumination). In general, any suitable facial illumination (sometimes referred to as facial skin surface illumination, skin illumination, facial surface illumination, etc.) may be produced. If desired, some emitted light from light source 32 may be visible to a user's eyes in eye boxes 18 without first reflecting from nose surface 28 or other portions of a user's face. Configurations in which facial illumination is visible to the user by virtue of illuminating the user's nose, cheeks, or other facial features are sometimes described herein as an example.

Light sources for producing illumination 34 such as light source 32 may be light-emitting diodes (e.g., light-emitting diodes formed from crystalline semiconductor dies such as mini light-emitting diodes and/or micro light-emitting diodes or other light-emitting diode dies, thin-film organic light-emitting diodes, etc.), may be lasers (e.g., laser diodes), or may be other light-emitting components. Light source 32 may emit white light, colored light, or other light. If desired, light source 32 may include multiple light-emitting components of different colors (e.g., red, green, blue, etc.). Control circuitry in device 10 can control the relative output intensities of these differently colored light-emitting components to adjust the color and intensity of emitted light 34. As an example, the color and intensity of nose illumination 34 may be adjusted based on measurements of the user's nose that are made using a light sensor and/or the attributes of the content being displayed on display 20 (e.g., so that nose illumination 34 has a color and intensity that matches the color and intensity of peripheral image content being displayed on display 20, etc.). Nose illumination 34 is not focused by lenses 22 (e.g., illumination 32 does not pass through lenses 22) and will generally have a fuzzy and diffuse appearance to the user. Nevertheless, the presence of nose illumination 34 will help visually fill in black bars that would otherwise be distracting to the user. In some configurations, nose illumination may be used to display an alert for a user. For example, nose illumination having a particular color, a particular intensity, and/or a particular attribute as a function of time (steady illumination, flashing illumination, etc.) may be presented to serve as a notification (e.g., when a particular event occurs in a video game, when a sensor in device 10 detects that device 10 is nearing a real-world obstacle such as a wall, or when other suitable notification criteria have been satisfied). Illumination color can be adjusted to create pleasing output for the user. For example, nose illumination color can be adjusted to match the color of content on display 20 or other display devices in device 10. If desired, optical components 14 of device 10 may include one or more peripheral display devices (e.g., light-emitting diodes and/or other light-emitting components of lower resolution than display 20 that are used to create peripheral light output in an area running along one or more peripheral edges of display 20 such as diffuse low-resolution lighting at the periphery of the user's field of view). In this type of configuration, the color of nose illumination can be matched to that of the peripheral illumination provided by the peripheral display device.

If desired, components 16 (e.g., input-output devices such as light sensors, etc.) can be mounted in support structure between lenses 22 (e.g., adjacent to source 32 of FIG. 2). For example, a light sensor for making light color and intensity measurements on nose surface 28 or other facial surfaces may be located adjacent to source 32 and information on these measurements can be used in adjusting the color and/or intensity of facial illumination such as nose illumination 34 (e.g., to help adjust nose illumination 34 to match displayed content, etc.). In some configurations, light sources and/or other components may be located on a peripheral portion of a lens holder or other support structures at the outer edge of lenses 22 (e.g., where shown by illustrative light source 32'). In general, any mounting location in the support structures of device 10 may be used for supporting one or more light sources 32 and/or other electrical components.

Figure 3:
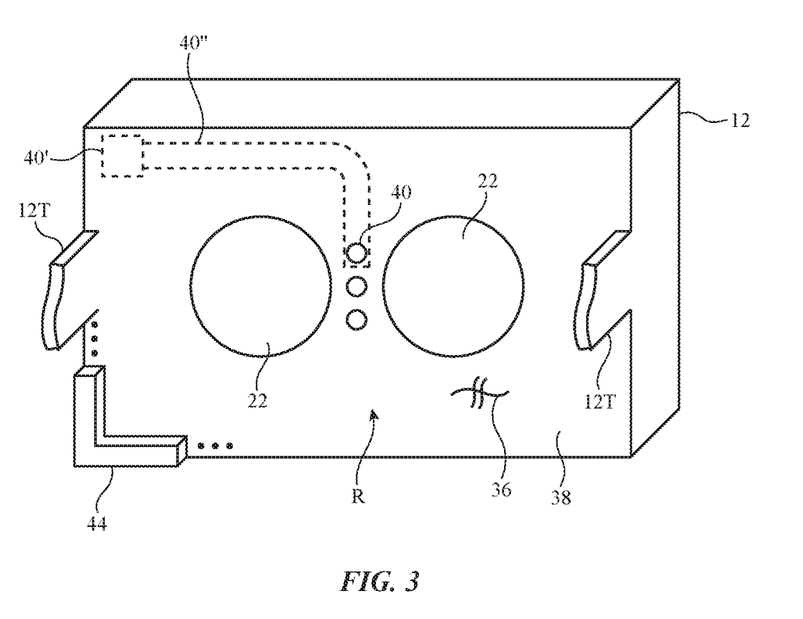
FIG. 3 is a rear perspective view of an illustrative head-mounted device in accordance with an embodiment.

FIG. 3 is a perspective view of the rear (inwardly facing) face R of device 10. As shown in FIG. 3, device 10 may have an inwardly facing housing wall (e.g., housing 12 on rear face R) that hides internal components from view when device 10 is not being worn on a user's head. Openings in the inwardly facing housing wall accommodate lenses 22. The inwardly facing housing wall may be formed from polymer, metal, glass, and/or other suitable structures.

In an illustrative configuration, some or all of the inwardly-facing housing wall on rear face R may be formed from fabric (e.g., fabric formed from intertwined strands of material such as strands 36. Strands 36 may be polymer strands, metal strands, multifilament strands, single filament strands, etc. Strands 36 may be intertwined by weaving, knitting, braiding, or other strand intertwining technique. The fabric formed from strands 36 may be soft to the touch and/or may have rigid portions. Optically, the fabric may be opaque and/or may have one or more portions that transmit light (e.g., when strands 36 of the fabric are formed of transparent material or are woven, knit, or otherwise intertwined loosely). In the example of FIG. 3, one or more light sources and/or other components such as light sensors may be mounted in locations 40. For example, light source 32 may be mounted at a location 40 behind the rear housing wall (e.g., a fabric rear housing wall or other housing wall). The fabric or other material forming the housing wall may be transparent to allow nose illumination to pass to the user's nose and/or openings or other window structures may be formed in the housing wall to allow nose illumination to pass to the user's nose. If desired, a light source may be located at a peripheral housing location such as location 40' and may supply light to one of locations 40 adjacent to the user's nose using a light guide (e.g., a waveguide in location 40"). In this way, light from a remote light source can be routed to the center of device 10 and outwardly towards the user's nose, which is adjacent to locations 40 when device 10 is being worn by the user).

A peripheral sealing member 44 (sometimes referred to as a seal or gasket) may be provided around the peripheral edge of housing 12 on rear face R. Sealing member 44 may be formed from a soft elastomeric polymer (e.g., silicone), foam, or other compressible material. When device 10 is being worn on a user's head (e.g., using housing portion 12T), member 44 may rest against the face of the user. To help illuminate the user's nose and reduce or eliminate visible black regions between the user's left and right eyes, some or all of member 44 may be formed from transparent material. This allows ambient light from the environment surrounding the user to pass to the user's nose, cheeks, and other portions of the user's face, thereby helping to reduce undesired black bar effects.

Figure 4:
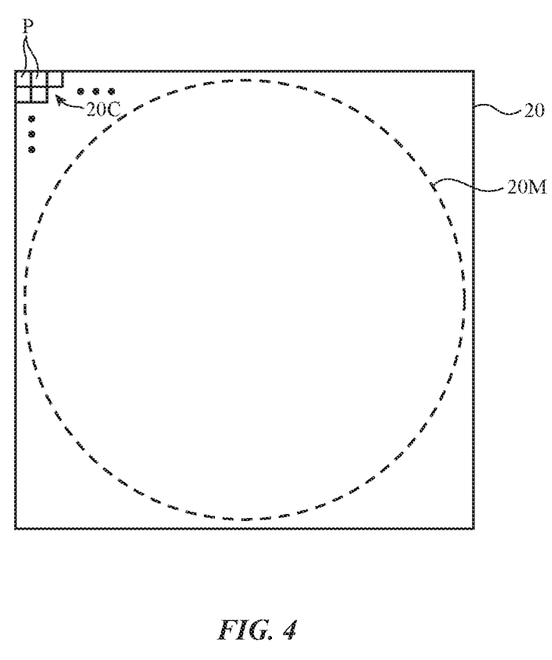
FIG. 4 is a diagram of an illustrative display having center pixels for displaying an image and corner pixels for providing user illumination in accordance with an embodiment.

FIG. 4 is a diagram of an illustrative portion of display 20 showing how a left or right display panel may have a central portion such as portion 20M that displays an image for viewing by a user through a lens. Display 20 (e.g., a left panel or right panel) may also have pixels P in corner portions of display 20 such as portions 20C. These pixels are not generally viewable by the user and may therefore be used to provide nose illumination or other facial illumination. Light emitted from corner portions 20C may be directed towards the surface of the user's nose through a light guide or may be routed to the user's nose using other optical components.

Figure 5:
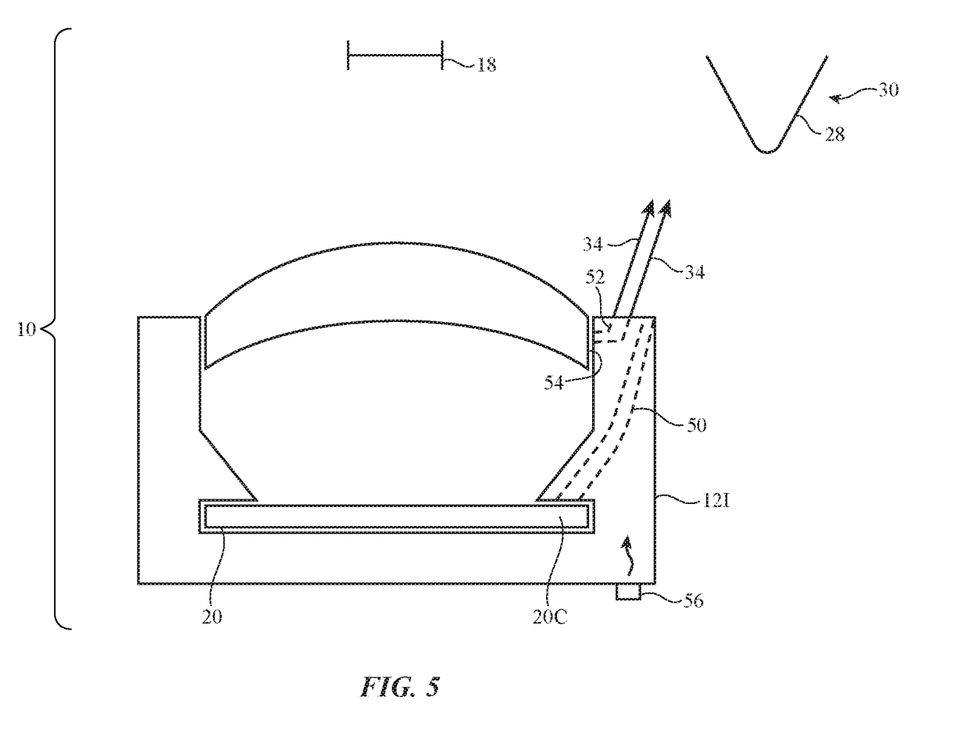
FIG. 5 is a cross-sectional side view of a portion of an illustrative head-mounted device having support structures that may be used in providing illumination in accordance with an embodiment.

FIG. 5 shows how lens support structures (e.g., interior housing portion 12I) may be used in supporting lens 22. Light guides may be formed in a support structure such as portion 12I (e.g., a lens holder), as illustrated by light guide 50 and light guide 52. Light guide 50 may receive light from pixels in corner portion 20C and may supply this light to nose 30 as nose illumination 34. Light guide 52 may receive light from edge surface 54 of lens 22 (which may be locally or globally uncovered by black ink that is otherwise used to help suppress stray light that has leaked from the edge of lens 22 without passing through and being focused by lens 22).

Figure 6:
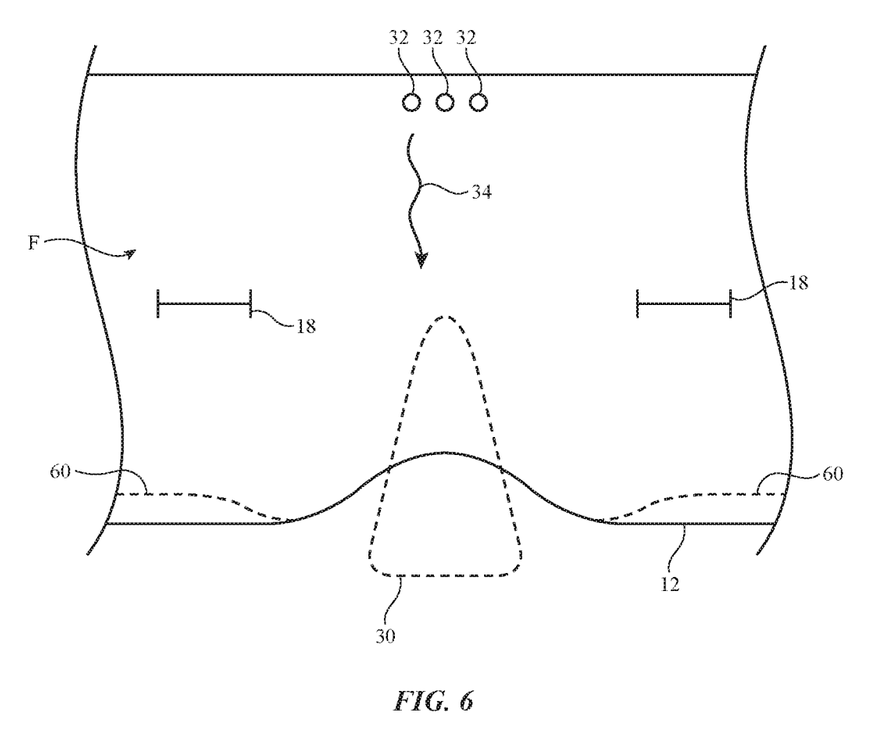
FIG. 6 is a front view of an illustrative head-mounted device in accordance with an embodiment.

FIG. 6 is a front view of device 10 showing how light sources 32 may be mounted along the upper edge of housing 12 so as to provide downwardly directed nose illumination 34 from above. In this location and/or other mounting locations, light sources 32 may, if desired, provide illumination that illuminates portions of a user's face such as the user's cheeks 60.

As described above, one aspect of the present technology is the gathering and use of information such as sensor information. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-generated reality: in contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands). a person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. Examples of CGR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground. Examples of mixed realities include augmented reality and augmented virtuality. Augmented reality: an augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof. Augmented virtuality: an augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware: there are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

The foregoing is merely illustrative and various modifications can be made to the described embodiments. The foregoing embodiments may be implemented individually or in any combination.

What is claimed is:

1. A head-mounted device, comprising:
  a display;
  lenses through which the display is visible from eye boxes;
  a head-mounted support structure, wherein the support structure is configured to support the display and lenses; and
  a light source configured to produce nose illumination.

2. The head-mounted device defined in claim 1 wherein the head-mounted support structure comprises a lens support structure between the lenses, wherein the light source comprises a light source selected from the group consisting of: a light-emitting diode and a laser, and wherein the light source is coupled to the lens support structure and is configured to supply the nose illumination to a nose surface without passing through the lenses.

3. The head-mounted device defined in claim 1 wherein the head-mounted support structure comprises an outwardly facing housing wall and an inwardly facing housing wall, wherein the display is located between the lenses and the outwardly facing wall, and wherein the lenses are visible from the eye boxes through openings in the inwardly facing housing wall.

4. The head-mounted device defined in claim 3 wherein the light source is configured to emit the nose illumination through an opening in the housing wall without passing through the lenses.

5. The head-mounted device defined in claim 3 wherein the inwardly facing housing wall comprises fabric and wherein the light source is configured to emit the nose illumination through the fabric.

6. The head-mounted device defined in claim 1 further comprising a peripheral sealing member around a peripheral edge of the head-mounted support structure, wherein the peripheral sealing member has a transparent portion configured to allow ambient light to pass.

7. The head-mounted device defined in claim 1 wherein the head-mounted support structure comprises a lens support structure with a light guide configured to guide light from the light source.

8. The head-mounted device defined in claim 1 wherein the light source is located at a peripheral edge of the head-mounted support structure, wherein the heated-mounted support structure comprises a support structure portion between the lenses, and wherein the head-mounted device further comprises a light guide configured to guide the nose illumination from the light source at the peripheral edge to the support structure portion between the lenses.

9. The head-mounted device defined in claim 1 further comprising a light sensor configured to gather nose measurements.

10. The head-mounted device defined in claim 9 further comprising control circuitry, wherein the control circuitry is configured to control the nose illumination produced by the light source based on the gathered nose measurements.

11. The head-mounted device defined in claim 1 further comprising control circuitry configured to display an image on the display, wherein the control circuitry is configured to control the nose illumination produced by the light source based on content in the image.

12. The head-mounted device defined in claim 1 further comprising a peripheral display device with a resolution lower than the display, wherein the display has a peripheral edge and wherein the peripheral display device is configured to provide peripheral illumination along at least some of the peripheral edge.

13. The head-mounted device defined in claim 12 wherein the peripheral illumination has a color, the head-mounted device further comprising control circuitry configured to control the nose illumination produced by the light source to match the color of the peripheral illumination.

14. A head-mounted device, comprising:
a display configured to produce image light;
lenses through which the display is viewable from eye boxes;
a head-mounted support structure configured to support the display and the lenses; and
a light source configured to produce illumination that is separate from the image light and that is visible from the eye boxes after being reflected from a facial surface.

15. The head-mounted device defined in claim 14 wherein the light source comprises a light source selected from the group consisting of: a light-emitting diode die and a laser diode.

16. The head-mounted device defined in claim 14 wherein the illumination produced by the light source reaches the eye boxes without passing through the lenses.

17. The head-mounted device defined in claim 14 further comprising a light guide configured to guide the illumination from the light source.

18. The head-mounted device defined in claim 14 wherein a portion of the head-mounted support structure forms a lens support structure with a light guide configured to receive the illumination from the light source.

19. A head-mounted device, comprising:
a display having a first portion configured to produce an image and a second portion configured to produce illumination that is separate from the image;
lenses through which the image is viewable from eye boxes; and
a head-mounted support structure configured to support the display and the lenses, wherein second portion of the display is configured to produce the illumination to illuminate a facial surface.

20. The head-mounted device defined in claim 19 wherein the facial surface comprises a nose surface, the head-mounted device comprising a light guide configured to supply the illumination to the nose surface.

21. The head-mounted device defined in claim 19 wherein the head-mounted support structure comprises lens support structures configured to support the lenses, wherein the lens support structures include a light guide, and wherein the light guide is configured to supply the illumination to the facial surface without passing through any of the lenses.

22. The head-mounted device defined in claim 19 further comprising:
a light sensor configured to measure the facial surface; and
control circuitry configured to adjust the illumination based on measurements of the facial surface from the light sensor.

* * * * *